US005596652A

United States Patent [19]

Piatek et al.

[11] Patent Number: 5,596,652

[45] Date of Patent: Jan. 21, 1997

[54] SYSTEM AND METHOD FOR ACCOUNTING FOR PERSONNEL AT A SITE AND SYSTEM AND METHOD FOR PROVIDING PERSONNEL WITH INFORMATION ABOUT AN EMERGENCY SITE

[75] Inventors: John T. Piatek, Williamsburg; Fredrick M. Muller, Traverse City; Brad W. Schnaidt, Grawn; Wayne D. Hanna, Traverse City, all of Mich.

[73] Assignee: Portable Data Technologies, Inc., Traverse City, Mich.

[21] Appl. No.: 409,308

[22] Filed: Mar. 23, 1995

[51] Int. Cl.$^6$ .......... G06K 9/00

[52] U.S. Cl. .......... 382/115; 382/183; 382/313

[58] Field of Search .......... 235/462, 376, 235/377, 378; 340/825.3, 825.31, 286.05, 585, 539, 586, 626, 521; 382/115, 183, 118

[56] References Cited

U.S. PATENT DOCUMENTS

| | | | |
|---|---|---|---|
| 5,113,445 | 5/1992 | Wang | 380/51 |
| 5,243,655 | 9/1993 | Wang | 380/51 |
| 5,266,780 | 11/1993 | Kamata et al. | 340/825.3 |
| 5,337,361 | 8/1994 | Wang et al. | 380/51 |
| 5,343,446 | 8/1994 | Simmons et al. | 368/251 |
| 5,393,965 | 2/1995 | Bravman et al. | 235/462 |
| 5,399,846 | 3/1995 | Pavlidis et al. | 235/462 |
| 5,406,491 | 4/1995 | Lima | 364/449 |
| 5,459,657 | 10/1995 | Wynn et al. | 364/401 |

OTHER PUBLICATIONS

Actionline, John T. Piatek, "A New Dimension in Bar Code Technology," Dec. 1993, (pp. 24–26).

Financial World®, Srikumar S. Rao, "Tomorrow's Rosetta Stones," Nov. 22, 1994, (pp. 70–72).

ID Systems, Craig Harman, "Two–Dimensional Standards and ISO Update," Nov. 1994, (pp. 22, 24 & 100).

Traverse City Record Eagle, T. M. Shultz, "GT County Firefighters to Test New Bar Coding Data System," Tuesday, Jul. 6, 1994.

Maryland/DC Firefighter, Brad Schnaidt, "The Fire Service and Barcodes–Approaching the 21st Century," vol. 9, No. 1, Autumn 1994 (pp. 155, 157, & 159).

The New York Times, Barnaby J. Feder, "For Bar Codes, an Added Dimension," Wednesday, Apr. 24, 1991.

Automatic I.D. News, Brad Schnaidt, "In the Line of Fire: 2–D Bar Codes Track Whose Battling Fires and Provide Rescue Workers With Firefighter's Medical History," Aug. 1994.

Fortune, Mark Alpert, "Building a Better Bar Code," Jun. 15, 1992.

*Primary Examiner*—Joseph Mancuso
*Assistant Examiner*—Jayanti K. Patel
*Attorney, Agent, or Firm*—Price, Heneveld, Cooper, DeWitt & Litton

[57] ABSTRACT

A personnel accountability system accounting for personnel reporting to a site. The personnel accountability system includes a bar code reader, a processor, and a display for reading bar codes carried by the personnel, which contain information pertaining to the personnel, such as qualification and medical information, and for subsequently storing and displaying the information contained in the bar codes. This system may also be used to read bar codes containing information regarding the site. Preferably, the bar codes are two-dimensional bar codes. This system is particularly suited for accounting for firefighters arriving at the scene of an emergency.

36 Claims, 6 Drawing Sheets

SPECIAL INFORMATION

SITE PRE-PLAN

TIER TWO

MSDS-HAVELINE SUPREME

SITE PRE-PLAN (HIGH RISE)

BUILDING CONSTRUCTION INFO

HAZ MAT LISTING & LOCATIONS

FIRE INSPECTOR'S REPORT

JOHN DOE

WARNING

THIS CARD IS ISSUED TO A DULY APPOINTED MEMBER OF THE GRAND TRAVERSE COUNTY FIRE DEPARTMENT

UNAUTHORIZED USE OF THIS CARD MAY SUBJECT THE USER TO CRIMINAL PROSECUTION

MEMBER'S SIGNATURE John Doe

Fig. 9

MEDICAL I.D. CARD

NAME JOHN DOE UNIT GT 1 ID# 001

ADDRESS 1111 EASY STREET

CITY/ST BEVERLY HILLS, CA 90210 HOME PHONE 555-1111

SPOUSE JANE DATE OF BIRTH 01/01/51

MEDICAL INFORMATION

BLOOD TYPE O PHYSICIAN WELBY 555-2222

PREFERRED HOSPITAL GENERAL INSURANCE CO BLUE CROSS

POLICY # 1234567-89012345

ALLERGIES CATS, POLLEN, PENICILLAN

MEDICAL CONDITION ONE KIDNEY REMOVED

SPECIAL INFORMATION CURRENTLY UNDER MEDICATION-4MG ERYTHROMYCIN DAILY

IN CASE OF EMERGENCY CONTACT

| NAME | PHONE | RELATIONSHIP |
|---|---|---|
| JANE | 555-1111 | SPOUSE |
| MARY | 1-555-3333 | MOTHER |
| SALLY | 813-555-4444 | SISTER |
| SHARON | 555-5555 | IN LAW |
| JIM | 312-555-6666 | BROTHER |

Fig. 10

SYSTEM AND METHOD FOR ACCOUNTING FOR PERSONNEL AT A SITE AND SYSTEM AND METHOD FOR PROVIDING PERSONNEL WITH INFORMATION ABOUT AN EMERGENCY SITE

BACKGROUND OF THE INVENTION

The present invention relates to a system and method for accounting for personnel at a site. More particularly, the present invention relates to a system and method for accounting for firefighting personnel at the scene of an emergency.

Nearly every fire department faces the problems of accounting for its personnel at the scene of an emergency, having an accurate and readily accessible medical history for any personnel that are injured, and knowing what is in a building before arriving on the scene and entering it.

Presently, to account for its personnel at a scene of an emergency, a fire department might require firefighters reporting to a scene to report to an incident commander who will assign the firefighter to a particular sector or subsector of the emergency site. Ideally, the incident commander will decide which sector of the scene to assign the firefighter based upon the firefighter's training and experience. However, when dealing with a number of volunteer firefighters or firefighters from other districts or departments, the incident commander may not know the level of training and experience of the reporting firefighter. As a result, firefighters may inadvertently be placed at risk of serious injury. The incident commander may expose him or herself and the fire department to a liability suit should a firefighter be injured after being assigned to a sector having a particular type of fire that the firefighter is not qualified to fight.

Additionally, an incident commander would ideally know which firefighters are assigned to each sector or subsector of the emergency site and would also know when and how long the firefighters have been located in their assigned sectors. By knowing which firefighters are assigned to which sectors, the incident commander can more effectively assign and reassign firefighters to the various sectors. Further, by knowing when and how long a firefighter has been within a particular sector, the incident commander can determine whether a particular firefighter has been in the particular sector for too long and whether the firefighter should be reassigned for temporary rehab. Additionally, the fire department or medical personnel may determine how long a particular firefighter was exposed to toxic fumes in order to determine the best course of treatment for the firefighter. Unfortunately, the only way for the fire department to keep such records would be to manually maintain a notebook including this information. Such notebooks are impractical to maintain at the scene of an emergency where there may be excessive smoke and water that could damage the notebook. Furthermore, not only does making the necessary entries into the notebook take a substantial amount of time, but the time required to subsequently look up the desired information makes the use of notebooks even more impractical.

The problems relating to firefighter accountability and record keeping on the scene have been magnified greatly in the recent past due to regulations put on fire departments by state and federal occupational safety and health administrations (OSHA). When assigning firefighters to various sectors and subsectors, an incident commander would certainly benefit by having more information regarding what potential dangers may be present in each sector and subsector in order to ensure that the firefighters assigned to the sector and subsectors are qualified to deal with these potential dangers. For example, if an incident commander knew that a particular subsector of a building contained certain hazardous materials, the incident commander could assign firefighters to this subsector who are qualified to deal with those hazardous materials.

Firefighters would additionally benefit by knowing what is in a building before arriving on the scene and entering the building. By knowing the layout and contents of a building before entering it, firefighters increase their safety and improve their ability to fight the fire. Further, it would be desirable if firefighters know where utility shut-offs are before entering a building. In order to have this information available at the scene, fire departments have had to haul volumes of documents to the scene and expend valuable time searching through these documents at the scene to locate the needed information pertaining to the building. The fire departments in some large municipalities have been known to maintain all of this documentation in the fire chief's car equipped with special air shocks to support the weight of these documents. Clearly, when dealing with a large and spreading fire, there may be no time to obtain the desired information. Additionally, the desired information frequently does not arrive at the scene before firefighters arrive at the scene and enter the building. Moreover, updating and maintaining these records is burdensome and time consuming.

In view of the inherent danger in fighting fires, the odds that a firefighter shall require medical attention are higher than usual. Therefore, it would be desirable to maintain the medical history of each firefighter at the site. However, maintaining and transporting documentation having this information presents additional burdens upon the fire department. This problem is amplified when numerous volunteers and firefighters from other districts are called to the scene of an emergency.

SUMMARY OF THE INVENTION

Accordingly, the present invention has been made to overcome the above problems. The personnel accountability system of the present invention easily and rapidly provides an incident commander, the firefighters, and medical personnel the information they require to perform their respective tasks in a safe and effective manner without requiring a fire department to maintain, transport, and sort through numerous documents. More particularly, the present invention permits a firefighter arriving in the first vehicle on the scene to obtain and review site information, which may be located in a lockbox at or near the scene. This site information may include floor plans, blueprints, interior photographs, fire inspection reports, hazardous material reports, material safety data sheets (MSDS), Tier-Two reports, which are the summary of all the material safety data sheets for chemicals, spill abatement procedures, and the location and identification of utility shut-offs. Thus, by allowing the first firefighter on the scene to obtain this valuable information, the firefighters subsequently arriving at the scene may be provided with information that will increase their safety and improve their ability to fight the fire.

Additionally, the present invention allows an incident commander to log in and obtain qualification information on each firefighter as they arrive on the scene and to quickly assign the firefighters to sectors or subsectors of the scene based upon the firefighters' qualifications. By simultaneously assigning a firefighter to a particular sector and logging in the firefighter, the incident commander can maintain readily accessible records of which firefighter is in which sector at any particular time and may determine how long the firefighter has been in a particular sector.

Another aspect of the personnel accountability system of the present invention is that it provides medical information associated with an injured firefighter to medical personnel at the scene without requiring the fire department or the medical personnel to maintain this medical information. The medical information may include the firefighter's medical history, allergies, medications being taken, hospital preference, insurance information, doctor's name and telephone number, and a list of individuals to contact in case of an emergency.

Additional features and advantages of the invention will be set forth in part in the description which follows and in part will be apparent from the description, or may be learned by practice of the invention.

To achieve these and other advantages, and in accordance with the purpose of the invention as embodied and broadly described herein, the personnel accountability system of the present invention includes machine-readable data associated with a person and including the person's identification, a data reader for reading the machine-readable data to log in the person associated therewith upon arrival at the site, determining the person's qualifications based upon information obtained by reading the person's machine-readable data, assigning the person to a sector of the site based upon the person's qualifications, and recording in the computer the sector to which the person is assigned. Such machine-readable data may be presented using radio frequency identification (RF ID) or sonic technologies, touch memory devices, magnetic stripes, or one-dimensional bar codes, and is preferably presented as a two-dimensional bar code.

The features and advantages of the invention may be realized and obtained by means of the instrumentalities and combinations particularly pointed out in the written description and claims hereof, as well as the appended drawings.

BRIEF DESCRIPTION OF THE DRAWINGS

The accompanying drawings, which are incorporated in, and constitute a part of, this Specification illustrate several embodiments of the invention and together with the description, serve to explain the objects, advantages, and principles of the invention.

FIG. 9 is a graphic illustration of an example of a card including a medical information bar code in accordance with the present invention; and FIG. 10 is a graphic illustration of an exemplary display screen showing medical information that may be provided in the medical information bar code shown in FIG. 9.

DESCRIPTION OF THE PREFERRED EMBODIMENTS

As mentioned above, the personnel accountability system of the present invention preferably utilizes two-dimensional bar codes and computer hardware systems for producing, reading, decoding, and interpreting such two-dimensional bar codes, and for priming or otherwise displaying the information contained in a two-dimensional bar code. Preferably, the present invention utilizes the PDF417 bar code technology and two-dimensional bar code readers developed by Symbol Technologies, Inc. of Bohemia, N.Y. Although the methods of making and using general purpose PDF417 bar codes are known, a brief general description of two-dimensional bar codes is provided below followed by a brief general description of an example of a computer hardware system that may be used to implement the present invention in its intended environment.

One-dimensional bar codes are commonly used to provide identification information that may be read into a computer. The computer may then use this identification information to access additional information associated with the identification information from a database for subsequent display. The amount of data that may be contained in a one-dimensional bar code is significantly less than that contained in a two-dimensional bar code. Two-dimensional bar codes may include either ASCI or binary dam and typically permit upwards of a hundred or more ASCI characters per quarter inch square, whereas one-dimensional bar codes typically contain up to twenty or thirty characters per inch. Thus, two-dimensional bar codes eliminate the need to access a database to obtain desired information, and allow immediate access to the information while in remote field locations.

Figure 1:
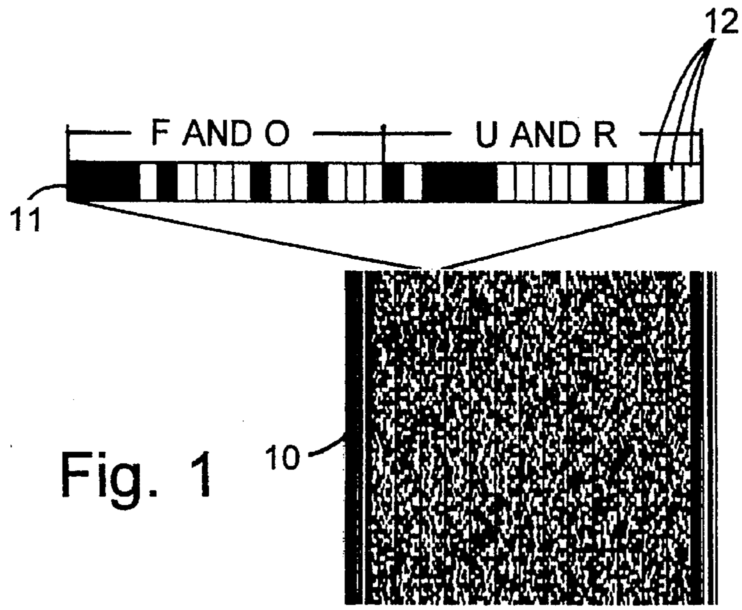
FIG. 1 is a graphic illustration of an exemplary two-dimensional bar code of the type used in the present invention.

FIG. 1 shows an example of a two-dimensional bar code 10. A two-dimensional bar code includes a plurality of rows and columns forming a grid, which is read by a raster-type scanner. The endmost columns include patterns identifying the columns as the staffing and stopping points of each row of data. The columns adjacent the endmost columns represent left and right row indicator codewords that may indicate the present row number, the total rows and columns in the bar code, and/or a security level. Other columns of a row may include error-detection codewords. The remaining columns are used to represent data codewords 11 within a row that may have a fixed length of, for example, seventeen bits of data. Each of these data codewords 11 may represent a plurality of ASCI characters. The bits of data 12 are represented by a white or black space of fixed width. The raster-type scanner projects a laser beam across each bit 12 and records a one or a zero for each bit depending upon whether the raster-type scanner detects a reflection of the laser beam for that bit position. The black spaces absorb the incident laser light and, thus, do not reflect a beam back to the raster-type scanner, while the white spaces reflect all of the incident laser light back to the scanner.

As mentioned above, in addition to providing a medium for storing data, two-dimensional bar codes typically include error-detection codewords that permit recovery of all of the data included in the two-dimensional bar code, even when as much as half of the bar code has been destroyed. These error-detection codewords also permit recovery of the data when the two-dimensional bar code is torn into several pieces with some of the pieces missing and the data is read from the remaining pieces.

For security purposes, the data presented in a two-dimensional bar code may be encrypted such that the data may only be recovered using custom decoding software. Further, using compression techniques, more than four thousand ASCI characters may be presented using two to three two-dimensional bar codes. Multiple two-dimensional bar codes may be linked together by incorporating linkage commands within each of the associated bar codes. By using such linked, two-dimensional bar codes and data compression techniques up to one gigabyte of data may be stored in the form of two-dimensional bar codes.

The bits of data presented in a two-dimensional bar code may represent ASCI characters, a photograph, or a computer command code. Presenting computer command codes in a two-dimensional bar code advantageously permits an individual to instruct a computer to execute commands without requiring the individual to use a keyboard. Thus, for example, an individual may input commands by reading an associated, two-dimensional bar code off a sheet of paper or other material that may have numerous other two-dimensional bar codes printed thereon associated with other executable commands. Hence, one or more sheets of paper, including these two-dimensional bar codes may be used in place of a keyboard. This aspect of two-dimensional bar codes makes this technology particularly useful in field applications where a small, portable reading device is desirable.

Additionally, the data presented in a two-dimensional bar code may represent a computer readable and executable batch file. Two-dimensional bar codes including batch file data are particularly useful when additional two-dimensional bar codes, including different forms of data, are subsequently read. For example, a first batch file contained in a two-dimensional bar code may invoke database software in a computer and set up a display screen for entering and displaying specified database fields. Subsequently, a second two-dimensional bar code including a data record having data corresponding to the database fields set up by reading the first batch file, may be read. The database fields may be a fixed or variable length. If the database fields are a fixed length, the batch file will associate the bar code's bit strings having a length equal to the fixed length of the database field with that field in a sequential manner. On the other hand, if the database fields have variable lengths, the data bits corresponding to a particular database field are separated in the two-dimensional bar code from the data bits corresponding to a subsequent database field by a fixed number of blank spaces. Later, an individual may wish to read a second batch file presented in another two-dimensional bar code such that the data presented in yet another two-dimensional bar code may be reconstructed by the computer into a photographic image.

Two-dimensional bar codes may be printed on a conventional printer connected to a personal computer. Further, due to the error correction coding, two-dimensional bar codes transmitted via facsimile may be accurately read. A more detailed description of PDF417 bar codes, and the systems and methods for making and using PDF417 bar codes, is disclosed in U.S. Pat. Nos. 5,113,445 and 5,337,361, the disclosures of which are herein incorporated by reference.

Figure 2:
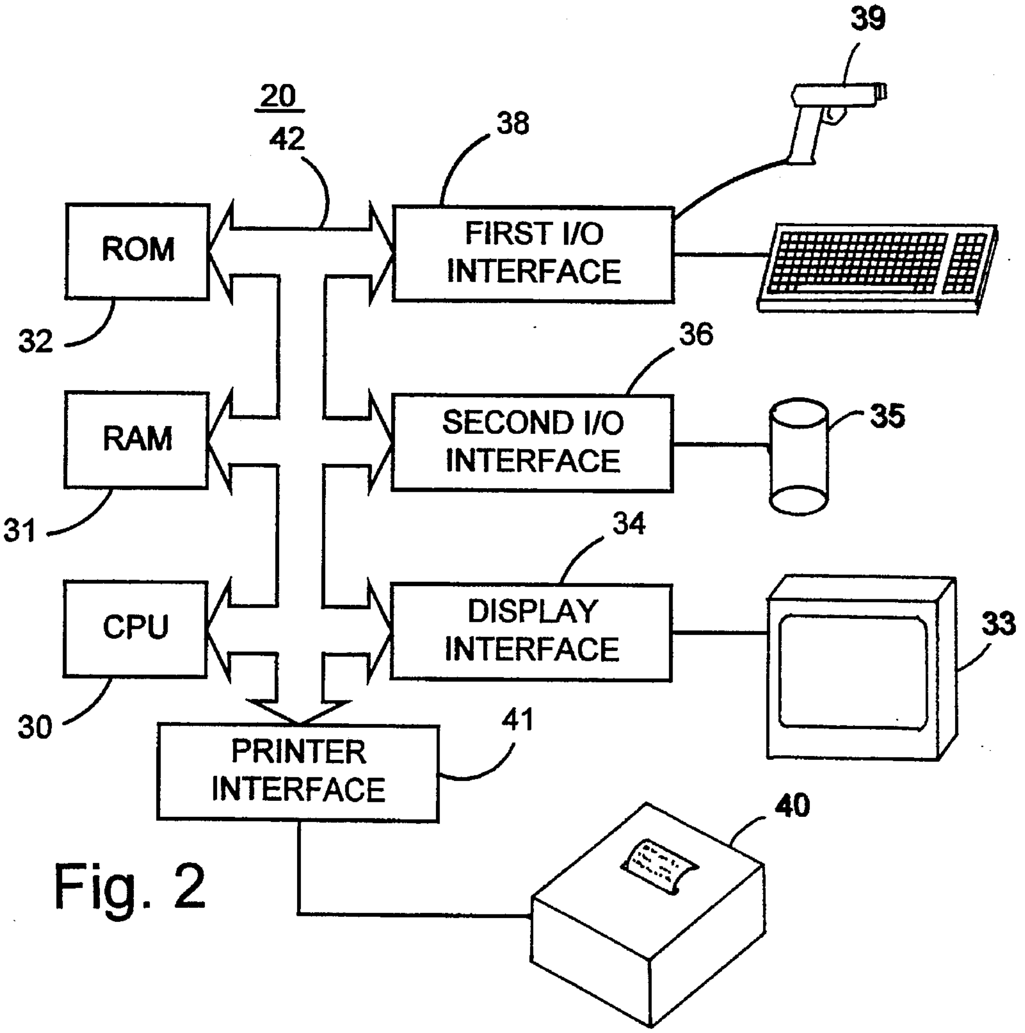
FIG. 2 is a block diagram illustrating a computer hardware system that may be utilized in implementing the present invention.

FIG. 2 shows an example of one computer hardware system 20 that may be used, in whole or in part, to implement the personnel accountability system of the present invention. As shown in FIG. 2, computer hardware system 20 includes a central processing unit (CPU) 30, a random access memory (RAM) 31, a read-only memory (ROM) 32, a display monitor 33, a display interface 34 connected to display monitor 33, a data storage device 35, a first input/output (I/O) interface 36 connected to data storage device 35, a keyboard 37, a second I/O interface 38 connected to keyboard 37, a data reader 39 connected to second I/O interface 38, a printer 40, a printer interface 41 connected to printer 40, and a system bus 42 for interconnecting CPU 30, RAM 31, ROM 32, display interface 34, first I/O interface 36, second I/O interface 38, and printer interface 41. Preferably, data reader 39 is a two-dimensional bar code reader, such as the PDF417 available from Symbol Technologies, Inc., however, to the extent other forms of machine-readable may be utilized, data reader 39 may take the appropriate form for reading such machine-readable data. Preferably, data storage device is a computer hard disk drive.

As will be apparent to those of ordinary skill in the art, with the possible exception of data reader 39 and printer 40, the components of computer hardware system 20 may be incorporated into a personal computer and are preferably incorporated into a portable or laptop computer. However, as will become apparent from the following description of the present invention, certain components of computer hardware system 20 may be eliminated depending upon the manner in which it is used within the confines of the present invention. For example, if computer hardware system 20 were used solely for producing and printing bar codes, data reader 39 may be eliminated. On the other hand, if computer hardware system 20 were used solely for reading bar codes and displaying the data contained therein, keyboard 37 may be eliminated and printer 40 would become optional unless one wished to print out information displayed on display monitor 33. By eliminating keyboard 37 and/or printer 40, computer hardware system 20 may be implemented in a very portable, small integral device. Clearly, the particular form taken by computer hardware system 20 will depend upon the manner and environment in which the system is used. Further, computer system 20 may also be configured with a cellular telephone, a global positioning system (GPS), digital camera, facsimile machine, image scanner, or FAX/Modem.

Having described the general components for implementing the personnel accountability system of the present invention, reference will now be made in detail to the present preferred embodiments of the invention, examples of which are illustrated in FIGS. 3 through 10.

Figure 3:
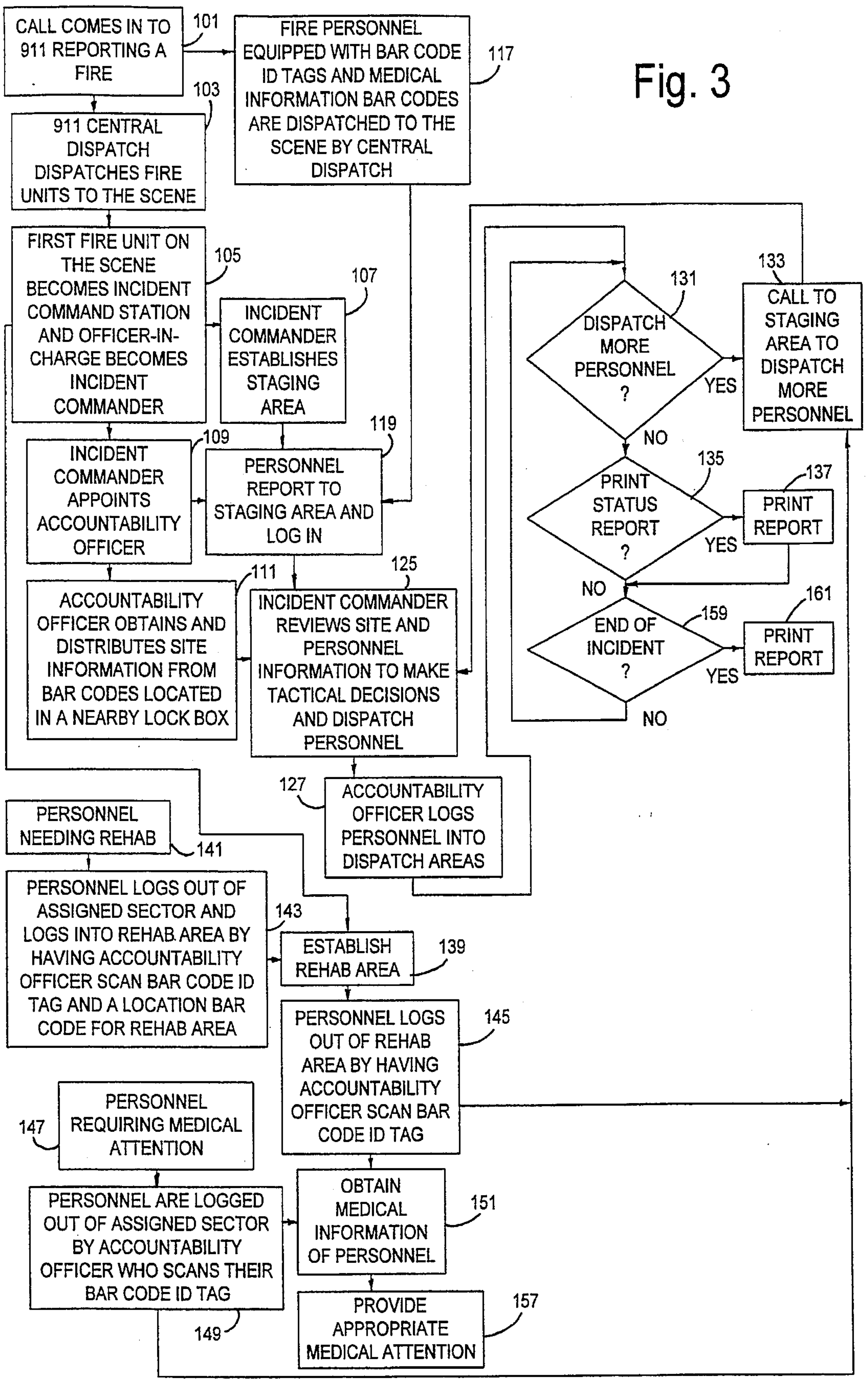
FIG. 3 is a flow diagram showing the overall flow of events that would typically occur at the scene of an emergency as a result of implementing the present invention.

FIG. 3 illustrates the overall flow of events that would typically occur at the scene of an emergency when the personnel accountability system of the present invention is implemented. The first event typically occurring is a call to 911 reporting a fire or other emergency (step 101). Upon receiving a call, the 911 central dispatch dispatches fire units to the scene (step 103). The first dispatched vehicle arriving at the scene assumes the role as the incident command station and the officer-in-charge of the first emergency vehicle becomes the incident commander (step 105). The incident commander's first tasks are to establish a staging area (step 107) and to appoint an accountability officer (step 109). The accountability officer obtains and distributes site information bar codes from a nearby lockbox (step 111 ). In the case of an over-turned hazardous-material (hazmat) truck, the site-information may be contained in a large two-dimensional bar code printed on the side of the trailer.

Figures 4, 5:
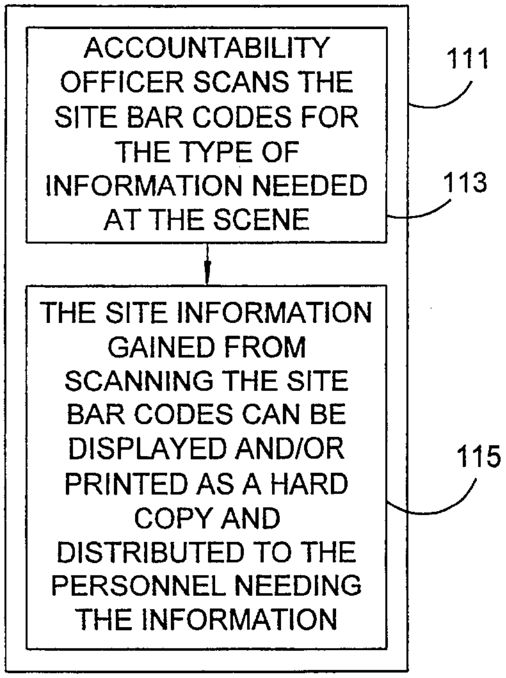
FIG. 4 is a flow diagram showing the flow of events that would typically occur to obtain site information using the present invention.
FIG. 5 is a graphic illustration of a record containing various site information bar codes.

The manner by which the accountability officer obtains and distributes site information is illustrated in the flow chart shown in FIG. 4. After locating the lockbox in which the desired site information is stored, the accountability officer removes the site information. Preferably the site information is all encoded in a number of two-dimensional bar codes on one or more sheets as shown in FIG. 5. Next, the accountability officer scans these bar codes using a bar code reader, such as bar code reader 39 of computer hardware system 20, such that the site information contained in the bar codes may be stored, displayed, and/or printed by computer hardware system 20 (step 113).

The site information that may be contained in two-dimensional bar codes includes floor plans, blueprints, photographs of interior portions of the site, fire inspection reports, material safety data sheets (MSDS), spill abatement procedures, Tier Two reports, and locations and identification of stored hazardous materials, utility shut-offs, and gas lines. Clearly, any other information regarding the site that may be beneficial to emergency personnel may be contained in two-dimensional bar codes.

After the accountability officer has scanned all the bar codes containing site information, the accountability officer may print out hard copies of any of the site information for distribution to the personnel needing the information (step 115). Thus, firefighters arriving at the scene of an emergency may greatly benefit by having access to site information they otherwise could not have obtained. Site information of the nature discussed above greatly improves firefighters' efficiency in fighting the fire and further improves the safety of the firefighters.

In addition to dispatching fire units to the scene, the 911 central dispatch also dispatches fire personnel to the scene by calling them on radios (step 117). Preferably, the dispatched fire personnel will already be equipped with a bar code I.D. tag and at least one medical information bar code. The bar code I.D. tag may be provided on a waterproof and fireproof material that can be sewn on, or applied to, garments or fabrics such as Velcro™. An example of such a material is Teslin manufactured by Pittsburgh Paint and Glass and Nomix manufactured by Du Pont. The bar code I.D. tags are preferably attached by Velcro™ to the storm flap of the firefighters turnout coat. Because the storm flap has to be fastened up to put on their breathing apparatus, firefighters have to take the bar code off the storm flap, because it would otherwise prevent the storm flap from being fastened. Thus, the firefighters will not forget to log in by removing the bar code I.D. tag. Preferably, the information contained on these bar code I.D. tags includes a firefighter's name, battalion or unit, levels of completed training, and experience in fighting various types of fires.

The medical information bar codes may also be provided on a fireproof and waterproof fabric or card that may be kept inside the firefighter's helmet and/or in the pocket of the firefighter's turnout coat. Preferably, the medical information bar codes include the individual medical history, such as allergy information, medications being taken, hospital preference, insurance information, doctor's name and telephone number, and a list of individuals to contact in case of an emergency.

Figure 6:
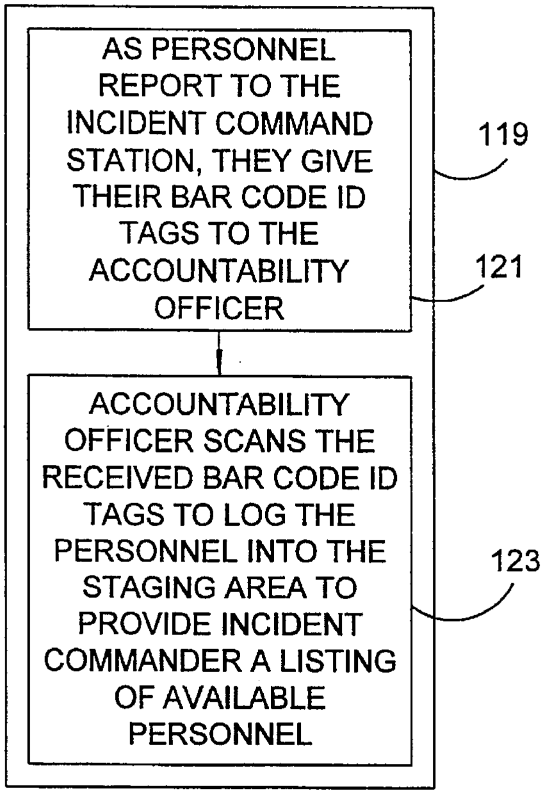
FIG. 6 is a flow diagram showing the flow of events that would typically occur to log in personnel using the present invention.

As the fire personnel arrive at the scene, they report to the staging area to log into the system (step 119). FIG. 6 illustrates the manner by which personnel are logged into the system. At the staging area, the arriving personnel remove their bar code I.D. tags from the storm flaps of their turnout coats and hand these bar code I.D. tags to the accountability officer (step 121). The accountability officer then scans the bar code I.D. tags to log in personnel into the staging area, thus compiling a listing of the personnel available for dispatch (step 123). Referring back to FIG. 3, the incident commander now has available site information, which is a compilation of all the interior locations of things that are in the building that a firefighter needs to know, such as where the shut-offs are, the gas and the water, where the elevators are, who to contact in case of an emergency, where the high value salvage areas are, where the hazardous materials, how much of it is there, fire inspection reports, material safety data sheets, Tier Two reports, site drawings of the building and photographs of the interior, and has a listing of the personnel available for dispatch that includes the level of training and experience of each of the available personnel. Having all this information available, the incident commander can make informed tactical decisions for fighting the fire and for insuring that a firefighter is not dispatched to a sector that may have a particular type of fire therein which the firefighter is not qualified to fight. Moreover, by having the site information, the incident commander can actually use this information to direct firefighters in the actual interior of the building from the outside of the building using the photographs of the interior, as well as the floor plan. Thus, the incident commander may insure that firefighting personnel are dispatched in the most effective and efficient manner by reviewing the listing of available personnel and their qualifications in light of the information contained in the site information bar codes.

Figure 7:
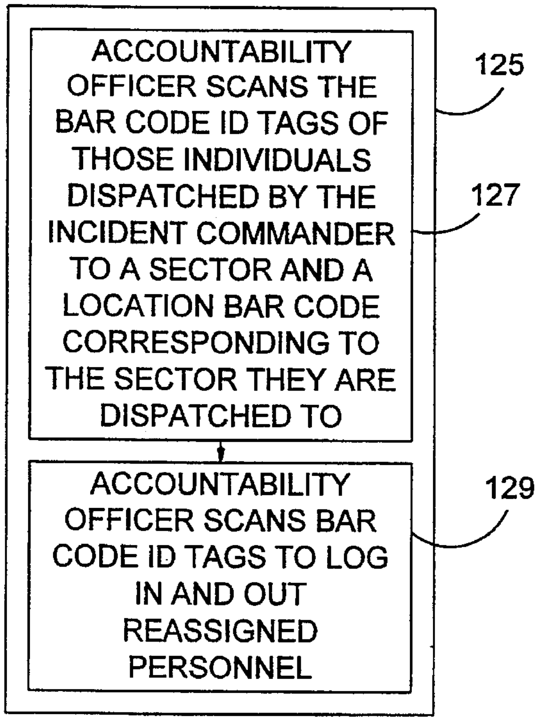
FIG. 7 is a flow diagram showing the flow of events that would typically occur to dispatch personnel using the present invention.

After the incident commander has made a decision to dispatch a particular person to a particular area of the site, the accountability officer logs that person into the assigned area (step 127). FIG. 7 illustrates the manner by which personnel are logged into or out of a particular area by the accountability officer. First, the accountability officer scans the bar code I.D. of those firefighters dispatched by the incident commander to a particular sector and then scans a location bar code identifying the particular sector to which the firefighters are dispatched (step 127). The sectors are defined using predetermined methods whereby the site is divided into quadrants and each quadrant represents a sector. These sectors may be divided into subsectors depending on the size of the site. Thus, by using a predetermined method of identifying sectors at a site, location bar codes may be prepared in advance on a single sheet of paper. After the personnel are assigned to a sector, they may be reassigned to another sector or logged out of the sector by the accountability officer who re-scans their bar code I.D. tags (step 129).

Returning to FIG. 3, at any time additional personnel need to be or are available to be dispatched (step 131), a call may be placed to the staging area to dispatch more personnel (step 133). Further, should the incident commander wish to review an up-to-date status report (step 135), he can print a report at any time including the current assignment status of all personnel on the fire scene, where they are, what they are trained to do, and their log in times (step 137).

Another task performed by the incident commander is to establish a rehabilitation (rehab) area where firefighters may obtain or replace an air tank or obtain relief (step 139). Thus, when any person requires rehab (step 141), they report to the rehab area where they are logged out of their assigned sector and logged in to the rehab area by scanning their bar code I.D. tags (step 143). When firefighters are ready to report back to the scene, the firefighters log out of the rehab area by again having their bar code I.D. tags scanned (step 145) and report to the staging area to be dispatched (step 133).

Should personnel require medical attention (step 147), they would log out of their assigned sector by having their bar code I.D. tag scanned (step 149) or, if in the rehab area, they would log out of the rehab area by again having their bar code I.D. tag scanned (step 145). This logging out procedure may be carried out by medical personnel calling the staging area, so that the accountability officer may log the person requiring medical attention out of their assigned sector (step 133). The medical personnel may then immediately obtain the person's medical information by scanning one of the medical information bar codes carried on the firefighter's equipment (step 151).

Figure 8:
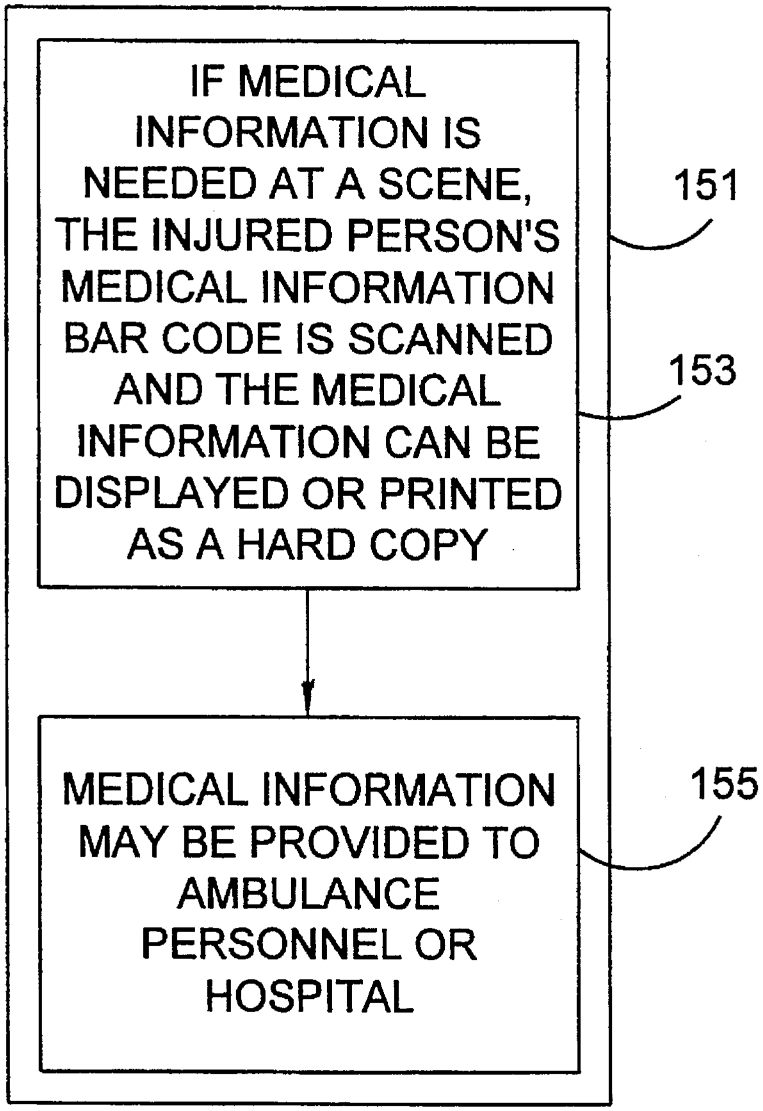
FIG. 8 is a flow diagram showing the flow of events that would typically occur to obtain medical information using the present invention.

The manner by which the medical personnel obtain this medical information is illustrated in FIG. 8. After scanning the medical information bar code, which may be printed on a card such as that shown in FIG. 9, the medical personnel may display the obtained information on a display monitor or print out a hard copy of this information (step 153). FIG. 10 shows an example of a display screen or report including the medical information that may be contained in a bar code. This medical information may then be handed to ambulance personnel or to personnel at a hospital (step 155). Because seconds may mean the difference between life or death for an injured firefighter, immediate access to medical information may be crucial. By placing the medical record on the firefighter, medical personal may immediately scan the bar code, get the medical record, and give the prognosis and medical records to the hospital over the radio or fax it to them. Thus, the medical information will be readily available so that immediate medical attention may be given to the injured firefighter (step 157). Additionally, upon arrival at the hospital, the firefighter may be immediately admitted to the emergency room without experiencing the routine delay typically encountered when such medical information is required before admittance.

After the fire has been put out and the fire personnel have been discharged, a report may be printed to fully reconstruct the deployment of personnel including which personnel were dispatched, where the personnel were dispatched, and the time each person spent in each area (steps 159 and 161).

Although the above example has been described with respect to deployment of firefighting personnel at the scene of an emergency, it will be appreciated that the personnel accountability system of the present invention may be employed to track any type of personnel and that the present invention is particularly suited for tracking safety and hazardous-duty personnel including police, paramedics, miners, military personnel, combat personnel, forest rangers, and construction workers at locations in which such personnel may be deployed. In such applications, the information contained in the bar codes would vary to suit the needs for each different application.

Further, although two-dimensional bar codes have been described as the preferred form of machine-readable data, other forms of machine-readable data, such as one-dimensional bar codes, touch memory devices, magnetic stripes, or machine-readable data implemented using sonic or RF ID technologies, or the like may also be used to practice the present invention.

The above described embodiment was chosen for purposes of describing but one application of the invention. It will be understood by those who practice the invention and by those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. A method for accounting for personnel at any site using a portable system having a data reading device comprising the sequentially performed steps of:

transporting the portable system to a site;

using the data reading device to read machine-readable data, which is associated with and carried by a person arriving at the site and which includes the person's identification and qualification information, in order to log that person into a computer;

determining the person's qualifications based upon information obtained by reading the person's machine-readable data with the data reading device so that the person arriving at the site can be assigned to a sector in which the person is qualified to work;

assigning the person to a sector of the site based upon the person's qualifications; and recording in the computer the sector to which the person is assigned.

2. The method as defined in claim 1, wherein the step of recording includes recording the time at which the person was dispatched to the assigned sector, wherein the time at which the person was dispatched is different from the time at which the person was initially logged into the computer.

3. The method as defined in claim 1, wherein the step of recording is carried out by reading additional machine-readable data associated with the sector after the person is logged into the computer.

4. A method for accounting for personnel at a site comprising the steps of:

reading a two dimensional bar code, which is associated with a person arriving at the site and includes the person's identification and the person's qualification information, in order to log that person into a computer so that the person arriving at the site can be assigned to a sector in which the person is qualified to work;

determining the person's qualifications based upon information obtained by reading the person's two dimensional bar code;

assigning the person to a sector of the site based upon the person's qualifications; and recording in the computer the sector to which the person is assigned.

5. The method as defined in claim 1 and further including the step of reading a two-dimensional bar code associated with the site to obtain and display information about the sectors of the site so that the person arriving at the site can be assigned to a sector in which the person is qualified to work.

6. A portable personnel accountability system for use at any site comprising:

at least one block of machine-readable data associated with a person and including the person's identification and qualification information;

a data reader for reading said at least one block of machine-readable data to log-in the person associated therewith upon arrival at the site;

a processor connected to said data reader for interpreting information read from said at least one block of machine-readable data and for obtaining the person's qualifications from the interpreted information read from said block of machine-readable data;

a display connected to said processor for displaying the person's qualifications such that the person may be assigned to a sector of the site based upon the person's displayed qualifications;

a memory connected to said processor for recording the sector to which the person is assigned; and means for supplying power to said data reader, processor, display, and memory from a non-commercial portable power source such as a battery or generator.

7. The system as defined in claim 6, said memory further records the time at which the person was dispersed to the assigned sector, wherein the time at which the person was dispatched is different from the time at which the person was initially logged in.

8. The system as defined in claim 6 and further including at least one second block of machine-readable data associated with the site, wherein said data reader reads the second block of machine-readable data after the person is logged in.

9. A personnel accountability system for use at a site comprising:

a two-dimensional bar code associated with a person and including the person's identification and the person's qualification information;

a data reader for reading said two dimensional bar code to log in the person associated therewith upon arrival at the site;

a processor connected to said data reader for interpreting information read from said two dimensional bar code and for obtaining the person's qualifications based upon the interpreted information;

a display connected to said processor for displaying the person's qualifications such that the person may be assigned to a sector of the site in which the person is qualified to work based upon the person's displayed qualifications; and a memory connected to said processor for recording the sector to which the person is assigned.

10. The system as defined in claim 6, wherein said at least one block of machine-readable data is carried by the person.

11. The system as defined in claim 6 and further including at least one two-dimensional bar code associated with the site and including information about the sectors of the site, wherein the information about the sectors of the site are displayed on said display so that a person arriving at the site can be assigned to a sector in which the person is qualified to work.

12. The system as defined in claim 6 and further including at least one two-dimensional bar code associated with a person that includes the person's medical information, wherein said data reader reads said two-dimensional bar code, and said display displays the medical information when the person associated therewith is in need of medical attention.

13. The system as defined in claim 6 and further including a printer connected to said processor for printing out a person's qualifications, and for printing out a report indicating the sectors to which the personnel were assigned and the times during which the personnel were located in the sectors.

14. A personnel accountability system for use at a site comprising:

at least one block of machine-readable data associated with a person and including the person's identification;

a data reader for reading said at least one block of machine-readable data to log-in the person associated therewith upon arrival at the site;

a processor connected to said data reader for interpreting information read from said at least one block of machine-readable data and for obtaining the person's qualifications based upon the interpreted information;

a display connected to said processor for displaying the person's qualifications such that the person may be assigned to a sector of the site based upon the person's displayed qualifications; and a memory connected to said processor for recording the sector to which the person is assigned, wherein the site is a scene of an emergency, said at least one block of machine-readable data is a two-dimensional symbology associated with a firefighter and including the firefighter's qualification information.

15. The system as defined in claim 14, wherein the firefighter's qualification information includes the firefighter's training and experience in fighting various types of fires.

16. The system as defined in claim 14 and further including at least one two-dimensional bar code associated with the site and including information about sectors of the site so that a firefighter arriving at the scene can be assigned to a sector the firefighter is qualified to work in.

17. The system as defined in claim 16, wherein said at least one two-dimensional bar code associated with the site includes information about the site including at least one of a floor plan, a blueprint, a photograph of an interior portion of the site, a fire inspection report, and locations and identification of stored hazardous materials, utility shut-offs, and gas lines.

18. A method for accounting for firefighting personnel at the scene of an emergency comprising the steps sequentially performed of:

using a data reading device to read machine-readable data associated with and carried by a firefighter arriving at the scene in order to log that firefighter into a computer;

determining the firefighter's qualifications based upon information obtained by reading the machine-readable data associated with the firefighter with the data reading device;

assigning the firefighter to a sector of the scene based upon the firefighter's qualifications; and recording in the computer the sector to which the firefighter is assigned.

19. The method as defined in claim 18, wherein the step of recording includes recording the time at which the firefighter was dispatched to the assigned sector, wherein the time at which the firefighter was dispatched is different from the time at which the firefighter was initially logged in.

20. The method as defined in claim 18, wherein the step of recording is carried out by reading additional machine-readable data associated with the sector after the firefighter is logged into the computer.

21. The method as defined in claim 18, wherein the machine-readable data associated with the firefighter is a two-dimensional bar code and the step of determining the firefighter's qualifications includes reading the firefighter's qualification information from the two-dimensional bar code associated with the firefighter.

22. The method as defined in claim 21, wherein the firefighter's qualification information includes the firefighter's training and experience in fighting various types of fires.

23. The method as defined in claim 18 and further including the step of reading a two-dimensional bar code associated with the scene to obtain and display information about the sectors of the scene so that the firefighter arriving at the scene can be assigned to a sector in which the firefighter is qualified to work.

24. The method as defined in claim 23, wherein the two-dimensional bar code associated with the scene includes information about the scene including at least one of a floor plan, a blueprint, photographs of interior portions, and locations and identification of stored hazardous materials, shut off valves, and gas lines.

25. A method for providing personnel with information about a site of an emergency, comprising the steps of:

locating machine-readable data associated with the site;

reading the machine-readable data to obtain information about the site that is stored in the machine-readable data; and displaying the obtained information to the emergency services personnel, wherein the information obtained by reading. the machine-readable data associated with the site includes at least one of a floor plan, a blueprint, a photograph of an interior portion of the site, a fire inspection report, and locations and identification of stored hazardous materials, utility shut-offs, and gas lines.

26. The method of claim 25, wherein the machine-readable data is a two-dimensional bar code.

27. The method of claim 25, wherein the step of displaying includes the step of displaying the obtained information on a display screen.

28. The method of claim 25, wherein the step of displaying includes the step of printing out the obtained information.

29. A system for providing emergency services personnel with information about a site of an emergency that is contained in at least one block of machine-readable data associated with the site, comprising:

a data reader for reading the at least one block of machine-readable data upon arriving at the site;

a processor connected to said data reader for interpreting site information read from the at least one block of machine-readable data; and a display connected to said processor for displaying the site information, wherein the information obtained by reading the machine-readable data associated with the site includes at least one of a floor plan, a blueprint, a photograph of an interior portion of the site, a fire inspection report, and locations and identification of stored hazardous materials, utility shut-offs, and gas lines.

30. The system as defined in claim 29, wherein the at least one block of machine-readable data is a two-dimensional bar code.

31. The method as defined in claim 1 and further including the step of displaying the person's qualifications on a display screen prior to assigning the person to a sector of the site.

32. The method as defined in claim 18 and further including the step of displaying the firefighter's qualifications on a display screen prior to assigning the firefighter to a sector of the scene.

33. The method as defined in claim 1, wherein said site is the scene of an emergency.

34. The method as defined in claim 4, wherein said site is the scene of an emergency.

35. The system as defined in claim 6, wherein said site is the scene of an emergency.

36. The system as defined in claim 9, wherein said site is the scene of an emergency.

* * * * *